June 6, 1933. V. BENDIX 1,912,819
BRAKE
Original Filed April 27, 1925
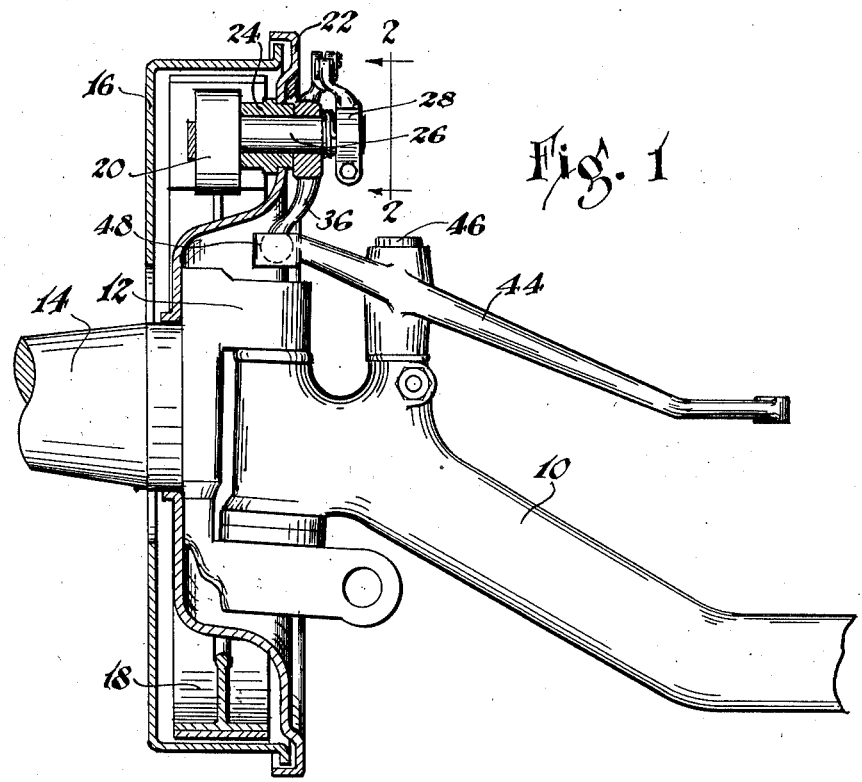
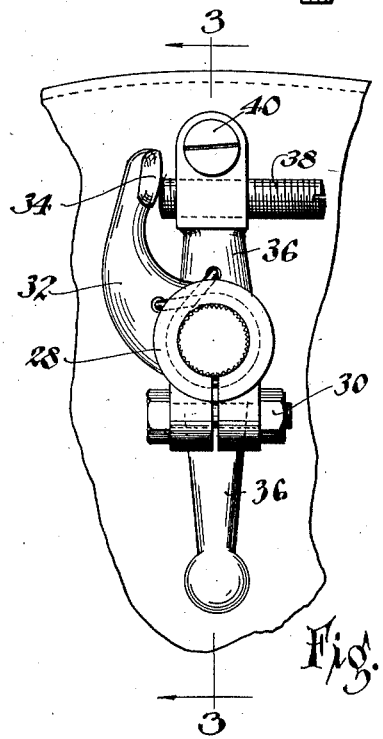
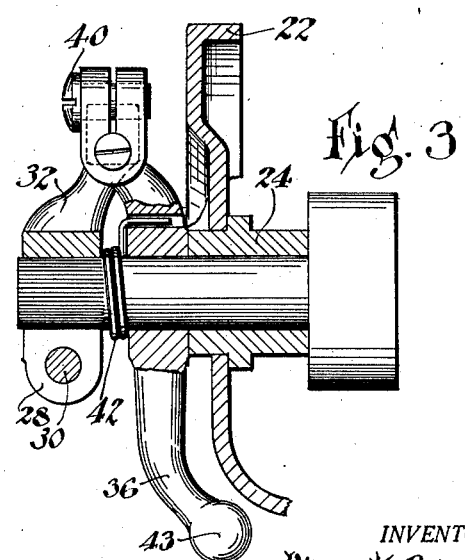
INVENTOR.
Vincent Bendix
BY
ATTORNEY Patented June 6, 1933

1,912,819

UNITED STATES PATENT OFFICE

VINCENT BENDIX, OF SOUTH BEND, INDIANA, ASSIGNOR TO BENDIX BRAKE COMPANY, OF SOUTH BEND, INDIANA, A CORPORATION OF ILLINOIS

BRAKE

Original application filed April 27, 1925, Serial No. 26,036. Divided and this application filed June 26, 1930. Serial No. 463,911.

This invention relates to brakes and more particularly to a brake operating mechanism for the swiveled or steering wheels of an automobile. The present application is a division of my co-pending application Serial No. 26,036 filed April 27th, 1925.

One of the objects of the invention is to provide a brake operating mechanism in which the detail parts are of simple form.

Another object of the invention is to provide a brake operating mechanism that is readily accessible.

Another object of the invention is to provide an easily adjusted brake operating means.

Another object of the invention is to provide a brake operating mechanism that is not subject to noises produced by loosely mating connections.

Other objects will appear from the following description of one embodiment of the invention which I have illustrated in the accompanying drawing, in which:

Figure 1 is an elevational view, partly in section, of the improved operating mechanism applied to an automobile brake.

Figure 2 is an enlarged view taken in the direction of lines 2—2 of Figure 1, and Figure 3 is a sectional view taken along lines 3—3 of Figure 2.

Referring to the drawing, there is shown at 10, an axle having a swiveled knuckle 12 at its end arranged to oscillate about a vertical axis. A wheel (not shown) is ordinarily mounted on the spindle 14 to which is attached brake drum 16 that rotates with the wheel. Within the brake drum 16 are brake shoes 18 operated by a cam 20 and a backing plate or support 22 is secured to the hub 12 and closes the open end of the drum. The rock shaft 26 is secured to the cam 20 and projects through the backing plate 22, it being journaled therein by a bearing 24.

On the outer end of shaft 26 are provided serrations or splines that interlock with a corresponding series of serrations in a lever 28 that is clamped upon the shaft by a bolt 30. The mating serrations of the shaft and lever allow the lever to be set in any desired position upon the shaft after which it may be permanently clamped thereto. The upper end of lever 28 is provided with an offset arm 32 having a bearing face 34. A lever 36 is pivotally mounted upon shaft 26 between the lever 28 and the backing plate 22. The upper end of lever 36 is offset into overlapping relation with the face 34 of lever 28 and carries an adjusting screw 38 arranged to contact with the lever 28 and provide an adjustment between the two levers.

The threaded portion of lever 36, is preferably slotted and has a clamping screw 40 for locking the adjusting screw 38 in its desired position. A torsion spring 42 is arranged on the shaft between the two levers and has its end portions secured to each of them in a manner to cause lever 36 to contact with lever 28 and prevent the contacting portions from producing objectionable noise during the operation of the vehicle. The lower portion of lever 36 terminates in a ball 43 at approximately the axis of knuckle 12. Lever 44 is pivotally secured to the axle 10 by bolt 46, and is arranged to move in a horizontal direction and have its end 48 contact with the ball 42 and move the cam 20 to operate the brake.

It will be noted that the present brake operating mechanism has two adjustments each of which is readily accessible. The lever 28 may assume a number of positions because of its splined connection to the shaft 26 and the relation of lever 28 and lever 36 may be varied as desired by adjusting screw 38.

While I have illustrated and described one embodiment of my invention, it is understood that this showing and description are illustrative only and that I do not desire to limit the scope of the invention to the form shown and described or otherwise except as defined in the following claims:

Having thus described the features of the invention, what I claim as new and desire to secure by Letters Patent is:

1. A brake comprising retarding means and an adjacent support, a rock shaft arranged to operate said means and journaled in the support, a pair of levers mounted side by side on the shaft, one of said levers being journaled on the shaft and the other secured thereto, said levers having portions arranged in overlapping relation, a torsion spring between said levers arranged to urge said levers into contact, and means to move the pivoted lever to operate the expanding means.

2. A brake comprising retarding means and an adjacent support, a rock shaft arranged to operate the retarding means journaled on the support, a pair of levers mounted side by side upon the shaft having overlapping portions one of said levers being secured to the shaft and the other pivotted thereon, a torsion spring on the shaft between the levers arranged to urge the overlapping portions toward each other, one of said portions having threaded means arranged to contact the other portion, means for locking the threaded means, and means to rotate the pivoted lever to operate the retarding means.

In testimony whereof, I have hereunto signed my name.

VINCENT BENDIX.